Figure 1:
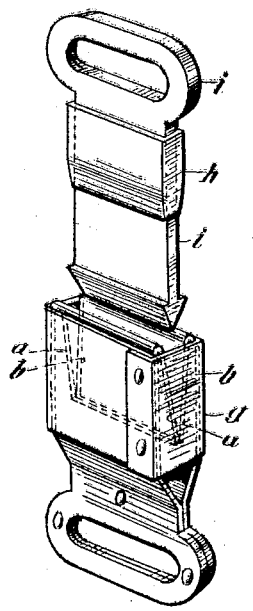

Sept. 29, 1931.   L. LASSELSBERGER   1,825,357
DISENGAGEABLE COUPLING DEVICE
Filed March 28, 1930

Inventor
Leopold Lasselsberger
By B. Singer, Atty

Patented Sept. 29, 1931

1,825,357

UNITED STATES PATENT OFFICE

LEOPOLD LASSELSBERGER, OF NIEDERNDORF, AUSTRIA

DISENGAGEABLE COUPLING DEVICE

Application filed March 28, 1930, Serial No. 439,803, and in Austria April 3, 1929. Renewed June 19, 1931.

The invention relates to a disengageable coupling device for any purpose such as for closing clothes, connecting belts or cords, hanging on cars, cattle or the like. In general the said device comprises two disengageable elements, one of which is capable of being inserted in the other element, means being provided for releasing the first named element, so that the latter is capable of being disengaged from the other element.

According to the present invention on the releasable element a single tubular member or a member substantially surrounding such element, such as a sleeve is slidably mounted, so that by longitudinally moving said sleeve inwards said element is freed and can be drawn out and cleared from the other element. Such an arrangement which enables a ready and reliable disengagement offers no parts projecting off from the device. Moreover the releasing means is easily operable and has a simple and nonexpensive structure.

Figure 2:
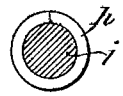
Figure 3:
Figure 4:
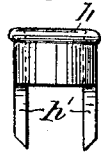

In the drawings:

Fig. 1 shows an embodiment of the invention illustrated perspectively by way of example. Figs. 2, 3, and 4 show modifications in cross sectional views and in perspective view respectively. The element $i$ of the coupling is capable of being inserted in the second element $g$ thereof. The latter contains springs or spring urged members $a$, $b$, which in case the element $i$ is introduced in the element $g$ are spread apart from each other and finally engage the element $i$ in such manner that the two elements $i$ and $g$ are coupled together.

For enabling the two elements to be separated a tubular member or a sleeve $h$ is slidably arranged on the element $i$. Said sleeve $h$ may be moved longitudinally into the element $g$ and between the members $a$, $b$, so that said members are shifted outwards and disengaged from the element $i$ or from an enlargement or head of the same as shown in Fig. 1. The element being freed may be drawn out.

The particular forms of the invention illustrated in the drawings are not to be taken as limiting it, but are intended to be illustrative of various manners of embodying and carrying it out.

The coupling device may be given any desired cross sectional shape for example a circular one (Fig. 2), or the tubular member $h$ may be formed by a strip of material bent completely or partially around the element $i$ as shown in Fig. 3.

The member $h$ may be a sleeve $h$ (Fig. 4) having one or two prongs $h'$ the latter serving to free the element $i$ or to spread the springs $a$, $b$ apart from each other.

Instead of two springs, or two spring urged members or pawls only one may be sufficient in some cases.

What I claim is:

In a disengageable coupling device comprising two elements, spring urged means for holding the two elements in engaged position and a member being slidably mounted on one element for releasing said holding means by merely longitudinal motion of said member, said means comprising two springs in the other element which may be spread apart from each other by said member for the purpose of disengaging the two elements.

In witness whereof I affix my signature.

LEOPOLD LASSELSBERGER.